United States Patent
Cheek, Jr.

(10) Patent No.: US 7,043,872 B2
(45) Date of Patent: May 16, 2006

(54) SABIKI SAVER

(76) Inventor: Raymond Townsend Cheek, Jr., 18651 Lenaire Dr., Miami, FL (US) 33157

( * ) Notice: Subject to any disclaimer, the term of this patent is extended or adjusted under 35 U.S.C. 154(b) by 0 days.

(21) Appl. No.: 10/375,524

(22) Filed: Feb. 27, 2003

(65) Prior Publication Data

US 2003/0217499 A1  Nov. 27, 2003

Related U.S. Application Data

(60) Provisional application No. 60/360,837, filed on Mar. 4, 2002.

(51) Int. Cl.
*A01K 97/06* (2006.01)
(52) U.S. Cl. .......................... 43/57.2; 43/57.1
(58) Field of Classification Search .............. 43/57.1, 43/57.2; 206/315.11
See application file for complete search history.

(56) References Cited

U.S. PATENT DOCUMENTS

| 357,206 | A | * | 2/1887 | Kamp | 206/315.11 |
| 2,804,717 | A | * | 9/1957 | Ripperdan | 43/57.2 |
| 3,057,464 | A | * | 10/1962 | Baggott | 206/37 |
| 5,934,464 | A | * | 8/1999 | Vargo et al. | 206/315.11 |
| 6,062,382 | A | * | 5/2000 | Czerkie | 206/315.11 |

* cited by examiner

*Primary Examiner*—Kurt Rowan
(74) *Attorney, Agent, or Firm*—Feldman Gale, P.A.

(57) ABSTRACT

A storage unit for holding a sabiki fishing rig includes a hollow inner tube having an outer diameter, a first inner end and a second inner end. The hollow outer tube has an inner diameter at least as large as the outer diameter of the inner tube, a first outer end, and a second outer end. A flared funnel, having a first funnel end and a second funnel end, is connected to the first inner end at the second funnel end, the first funnel end defining scalloped notches and a receiving space tapering inward for receiving the sabiki rig. A bottom collar has a recessed cross-member for holding at least a part of the sabiki rig, the bottom collar being attached to the second outer end of the outer tube. A locking collar slidably connects the inner tube to the outer tube.

8 Claims, 7 Drawing Sheets

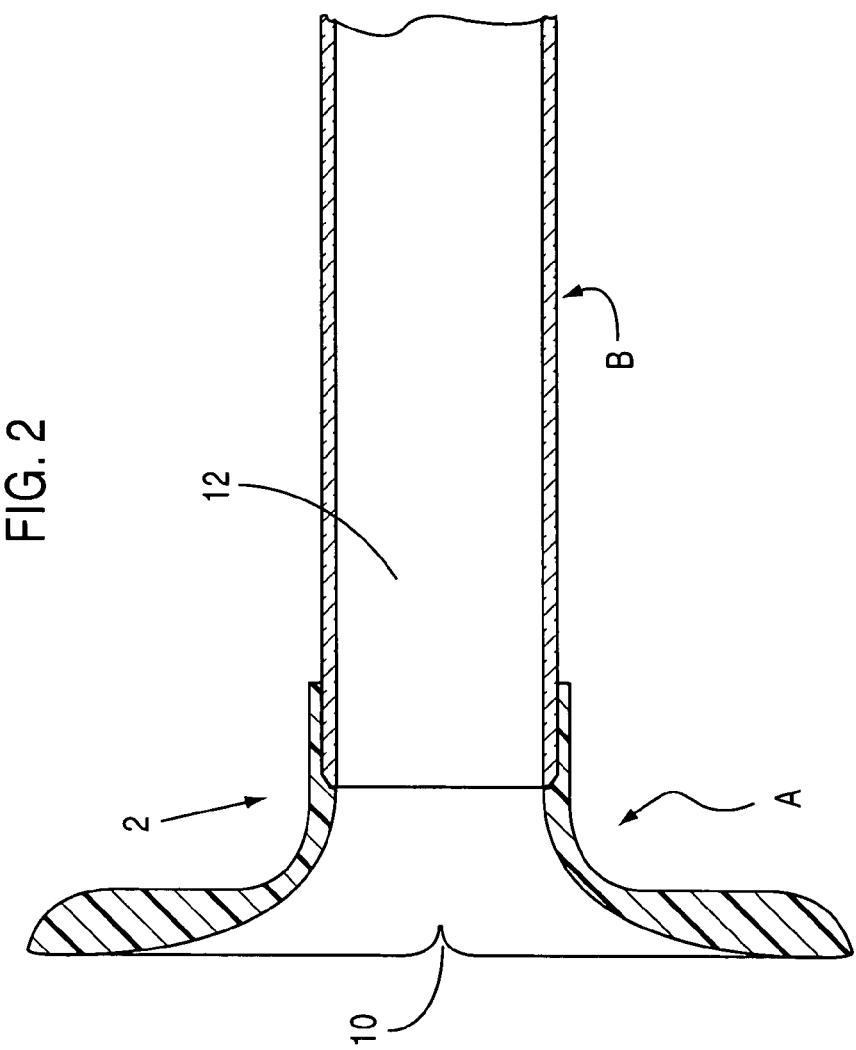

SABIKI SAVER

CROSS-REFERENCE TO RELATED APPLICATION

This application claims the benefit under 35 U.S.C. § 119(e) of U.S. Provisional Application No. 60/360,837, filed Mar. 4, 2002, the complete disclosure of which is hereby incorporated by reference in its entirety.

BACKGROUND OF THE INVENTION

Field of the Invention

The present invention relates to the field of fishing, specifically, to catching live baitfish, and, in particular, for storing a live bait rig or sabiki rig. The present invention is also referred to as a Sabiki Saver and is a fishing tool used for storing sabiki rigs.

Sabiki rods exist in the prior art. Such rods include a long tube to which a fishing reel is attached. A sabiki rig is stored inside the rod. The sabiki rig includes a monofilament main line with several hooks or quills branching off the main line every eight to ten inches, for example. Sabiki rigs are used to catch multiple baitfish at once. Storage on the sabiki rod is not easily achieved due to the long fixed length of the sabiki rig.

Prior art measures for storing a sabiki rig were simply to leave it hooked to the line of a regular fishing rod, secure the bottom of the rig to the fishing reel, and set it in a rod holder. This configuration is very dangerous because it leaves six to eight razor sharp hooks swinging in an open-air environment, for example, on a boat.

SUMMARY OF THE INVENTION

The Sabiki Saver of the present invention eliminates the need for a "special rod" for only catching baitfish. The sabiki rig, after each use, is secured in the device of the invention. Due to the telescopic properties of the present invention, it can be reduced in length and stored away, freeing up the fishing rod that was used in catching baitfish to be returned to regular fishing use.

Another advantage of the present invention lies in the fact that, when the device is not loaded with a sabiki rig, it can be reduced to half its operative length for compact storage. This advantage is not present with prior art sabiki rods. The very dangerous prior art sabiki rods left six to eight razor sharp hooks swinging in an open-air environment. With the Sabiki Saver of the present invention, this threat is easily put to rest. The rig is simply lowered in the tube and secured for future use.

The present invention provides a unique and useful storage adjustable compartment for live bait rigs such as sabiki rigs. The Sabiki Saver has two tubes made of PLEXIGLAS®, plastic, PVC, acrylic, or a similar material. The end of one tube has a flared notched top made of plastic or a similar material and the other tube, made of plastic or a similar material, has a cross-member collar on the bottom. The tubes are secured together by a locking collar. The sabiki rig is lowered into the top of the Sabiki Saver and through the unit to the bottom of the unit. There, the rig is hooked to the cross-member with a stainless steel I-hook that is provided with the Sabiki Saver. The rig is pulled tight and is secured at the top using a scalloped notch. The locking collar enables the invention's telescopic construction to accommodate most sabiki rigs.

BRIEF DESCRIPTION OF THE DRAWINGS

FIG. 2 is an enlarged, fragmentary, cross-sectional view of a portion of the sabiki saver of FIG. 1;

DESCRIPTION OF THE PREFERRED EMBODIMENTS

Figure 1:
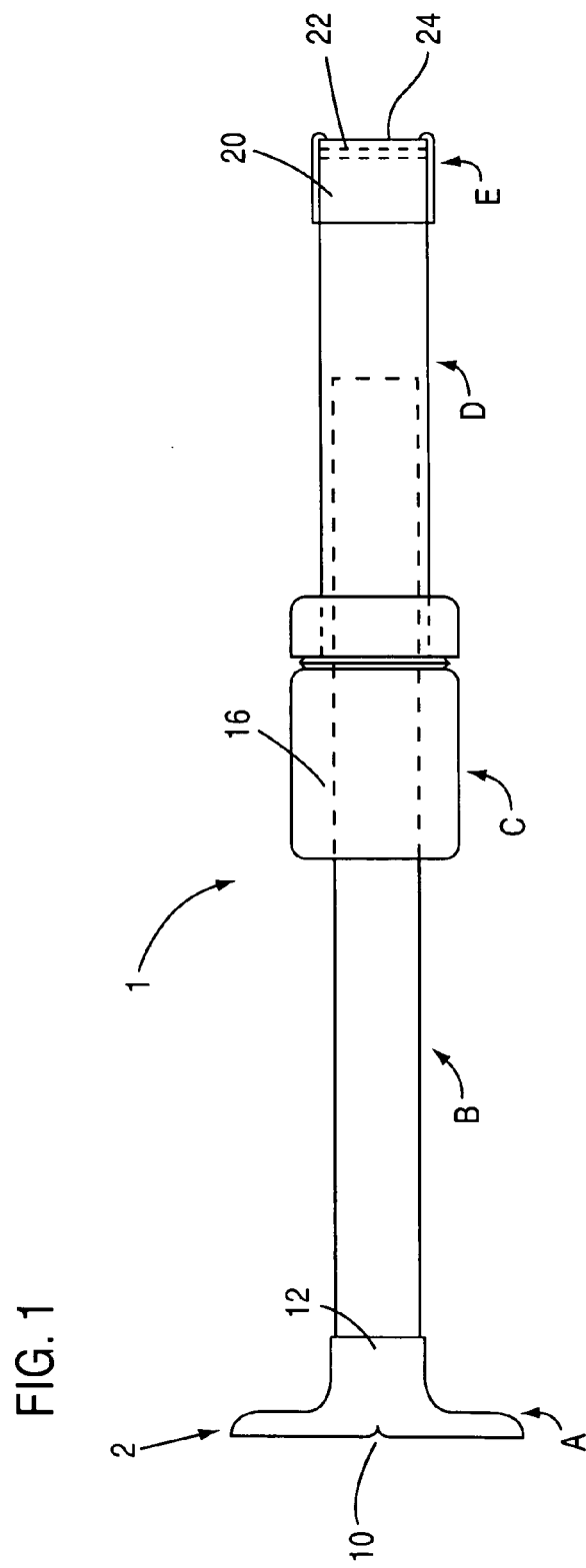
FIG. 1 is a side elevational and partially hidden view of an embodiment of a sabiki saver according to the invention.

Referring now to the figures of the drawings in detail and first, particularly to FIG. 1 thereof, there is shown an embodiment of a Sabiki Saver according to the invention. In FIG. 1, the funnel end piece A is attached to the inner tube B and is passed through the locking collar C. The locking collar C is attached to the outer tube D and receives the bottom collar E.

Figure 2A:
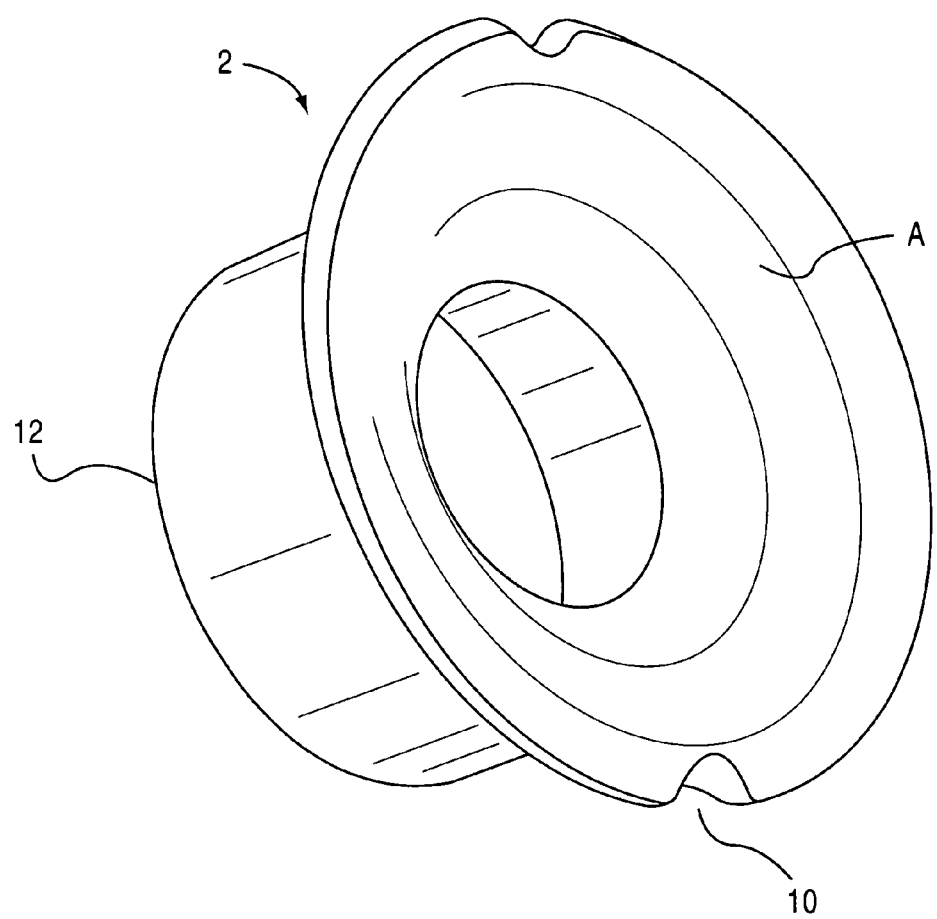
FIG. 2A is a perspective view of a funnel of the sabiki saver of FIG. 1.

FIG. 2 illustrates how the attachment between the funnel end piece A and the inner tube B are made and has a tapered shoulder that fits the inner tube B therein. In FIG. 2, the end piece A, which is made of polypropylene or a similar material, is shown in an embodiment that slides over the inner tube B.

Figure 3:
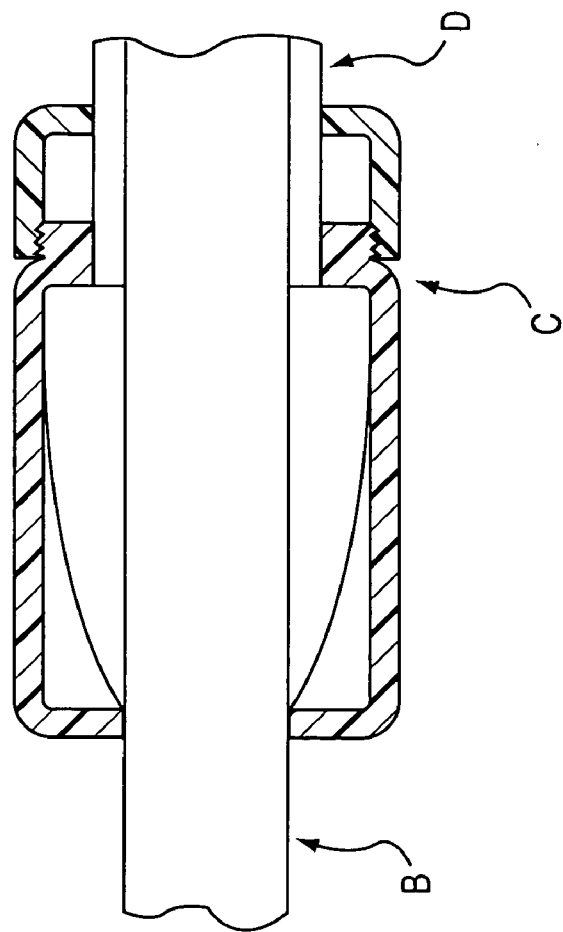
FIG. 3 an enlarged, fragmentary, cross-sectional view of a portion of the sabiki saver of FIG. 1.

FIG. 3 illustrates a prior art lock collar attached to the outer tube D.

Figure 4:
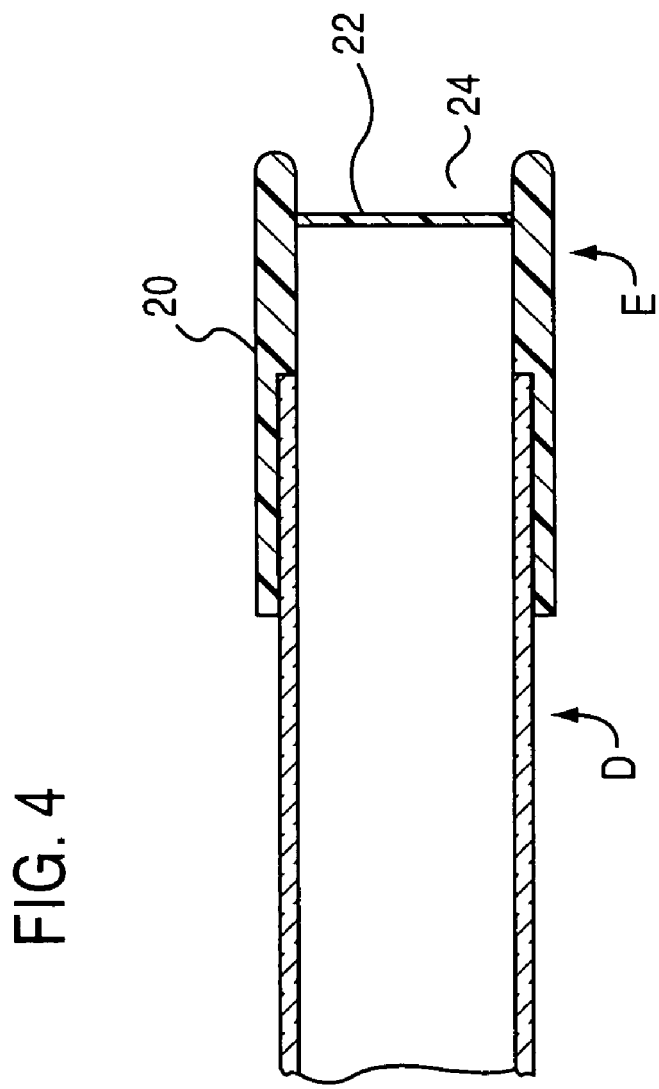
FIG. 4 is an enlarged, fragmentary, cross-sectional view of a portion of the sabiki saver of FIG. 1.

FIG. 4 illustrates the bottom collar E attached to the outer tube D by a shoulder sleeve.

Figure 5:
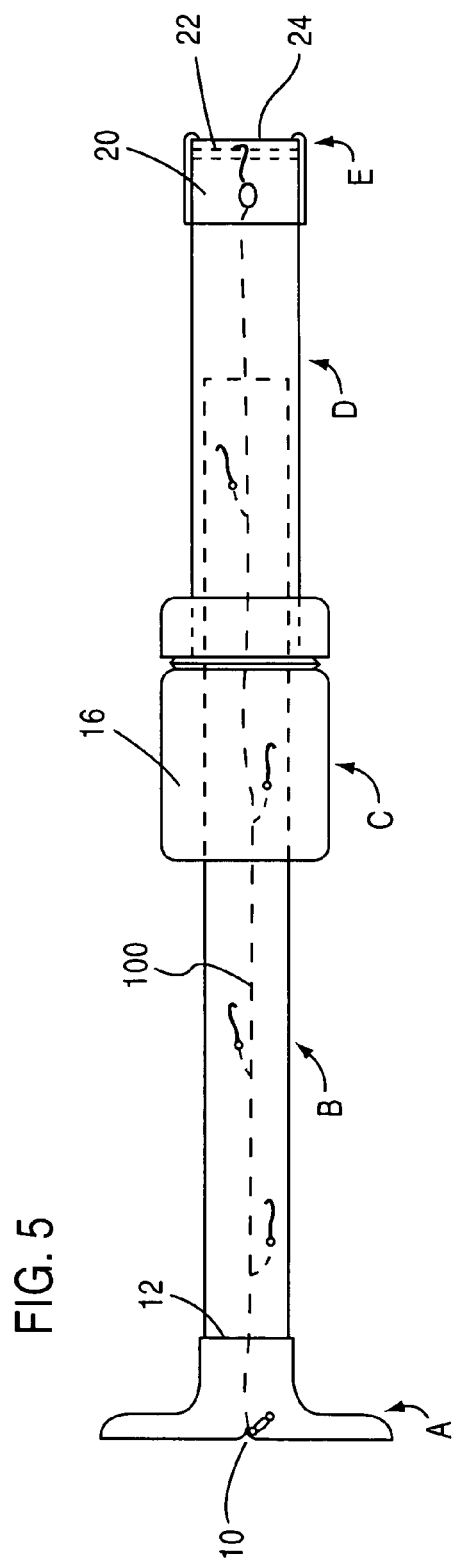
FIG. 5 is a side elevational and partially hidden view of the sabiki saver of FIG. 1 with a sabiki rig therein.

FIG. 5 illustrates the sabiki rig secured on the top flange of the funnel end piece A using scalloped notches and the sabiki rig is secured on the bottom of the assembly of the invention using the bottom collar E, which includes a cross member 22.

Figure 4A:
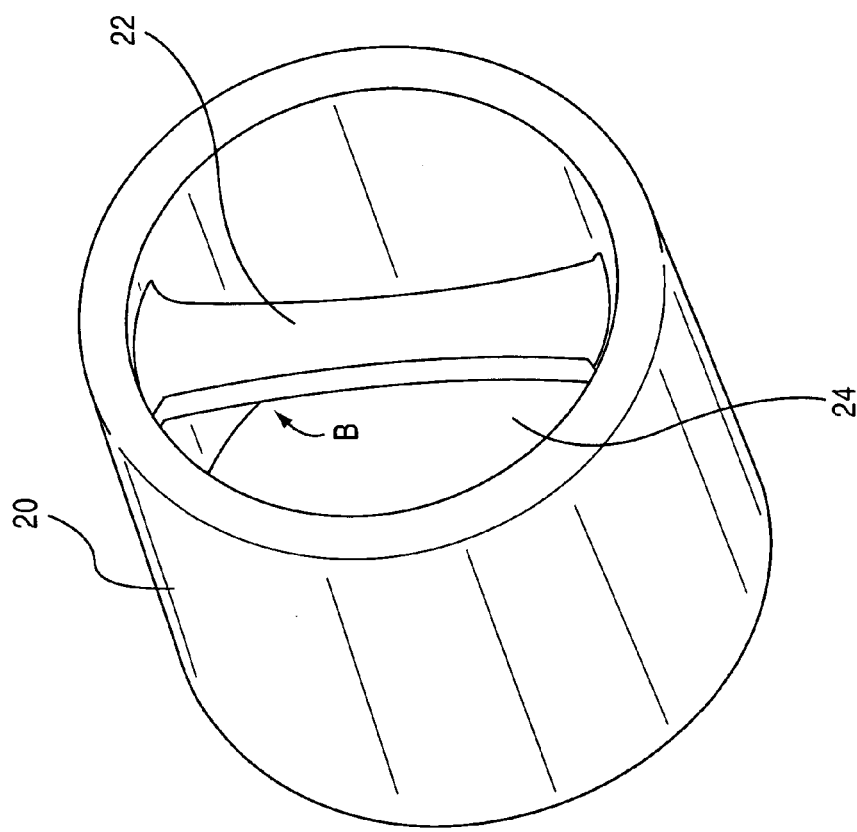
FIG. 4A is a perspective view of a collar of the sabiki saver of FIG. 1.

The sabiki saver 1 has two telescopic tubes B,D made of PLEXIGLAS®, plastic, PVC, acrylic or a similar material, held together by a locking collar 16, C. A flared funnel top piece 2 is attached to a top end of the inner or smaller tube B. The funnel top piece 2 (shown, in particular, in FIGS. 2 and 3) is made of polypropylene or a similar material and has several securing notches 10 on the leading edge of the funnel 2. The bottom of the inner tube B is beveled at a 45-degree angle. The outer or larger tube D, which is made of PLEXIGLAS®, plastic, PVC, acrylic, or a similar material, has a bottom collar 20, E attached to a bottom end thereof as shown in FIG. 4. As shown in FIG. 4A, the bottom collar 20 has a cross-member 22 and a throat 24. The smaller tube B slides inside the larger tube D. The smaller tube B is secured to the larger tube D by a locking collar 16, C (manufactured by others), which is shown in FIG. 3.

When a sabiki rig 100, is taken out of its package, a sinker J-hook combination is attached to the provided snap swivel. The sabiki saver 1 is adjusted to be a few inches shorter than the sabiki rig 100. As shown in FIG. 5, the sabiki rig 100 is lowered through the top funnel 2 to the bottom of the larger tube D, the J-hook is fastened to the cross-member 22. The rig 100 is pulled tight by moving the funnel 2 (attached to the smaller tube B) away from the bottom collar 20 (attached to the larger tube D), and the top end of the rig 100 is secured by pinching the monofilament (attached to the rig 100) into one of the securing notches 10.

The invention claimed is:

1. A storage unit for holding a sabiki fishing rig, comprising:
   - hollow inner tube having an outer diameter, a first inner end and a second inner end;
   - hollow outer tube having an inner diameter at least as large as said outer diameter of said inner tube, a first outer end, and a second outer end;
   - flared funnel having a first funnel end and a second funnel end, said funnel being connected to said first inner end at said second funnel end, said first funnel end defining scalloped notches and a receiving space tapering inward for receiving the sabiki rig;
   - a bottom collar having a recessed cross-member for holding at least a part of the sabiki rig, said bottom collar being attached to said second outer end of said outer tube; and
   - a locking collar slidably connecting said inner tube to said outer tube.

2. The unit according to claim 1, wherein said tubes are of a material selected from at least one of the group consisting of acrylic and polymethylmethacrylate.

3. The unit according to claim 1, wherein said flared funnel piece is of a material selected from at least one of the group consisting of polypropylene and rigid rubber.

4. The unit according to claim 1, wherein said bottom collar is of a material selected from at least one of the group consisting of polypropylene and rigid rubber.

5. The unit according to claim 1, wherein at least one of said scalloped notches has a v-shaped groove for receiving therein a part of the sabiki rig.

6. In a sabiki fishing rig assembly, a holder for storing a sabiki rig comprising:
   - a hollow inner tube having an outer diameter, a first inner end and a second inner end;
   - a hollow outer tube having an inner diameter at least as large as said outer diameter of said inner tube, a first outer end, and a second outer end;
   - a flared funnel having a first funnel end and a second funnel end, said funnel being connected to said first inner end at said second funnel end, said first funnel end defining scalloped notches holding a part of the sabiki rig and a receiving space tapering inward receiving the sabiki rig therein;
   - a bottom collar having a recessed cross-member holding at least a part of the sabiki rig, said bottom collar being attached to said second outer end of said outer tube; and
   - a locking collar slidably connecting said inner tube to said outer tube.

7. The holder according to claim 6, wherein at least one of said scalloped notches has a v-shaped groove for receiving therein a part of the sabiki rig.

8. The holder according to claim 6, wherein one of said scalloped notches has a v-shaped groove for receiving therein a line-attaching end of the sabiki rig.

* * * * *